US012560874B2

(12) United States Patent
Kato et al.

(10) Patent No.: US 12,560,874 B2
(45) Date of Patent: Feb. 24, 2026

(54) METHOD FOR PRODUCING TONER

(71) Applicant: FUJIFILM Business Innovation Corp., Tokyo (JP)

(72) Inventors: Yuya Kato, Kanagawa (JP); Takeshi Tanabe, Kanagawa (JP); Takahiro Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 685 days.

(21) Appl. No.: 17/945,318

(22) Filed: Sep. 15, 2022

(65) Prior Publication Data

US 2023/0266687 A1 Aug. 24, 2023

(30) Foreign Application Priority Data

Feb. 21, 2022 (JP) ................................. 2022-024961

(51) Int. Cl.
*G03G 9/08* (2006.01)

(52) U.S. Cl.
CPC .................................. *G03G 9/0817* (2013.01)

(58) Field of Classification Search
CPC .............................. G03G 9/0817; B01D 50/20
See application file for complete search history.

(56) References Cited

U.S. PATENT DOCUMENTS

2018/0164737 A1* 6/2018 Iwasaki .................. G03G 21/12
2018/0298119 A1* 10/2018 Garner ..................... B01J 8/006

FOREIGN PATENT DOCUMENTS

JP 06-055102 A 3/1994
JP 2017189740 A * 10/2017

OTHER PUBLICATIONS

English machine translation of the description of JP-2017189740-A (Year: 2017).*

* cited by examiner

*Primary Examiner* — Mark F. Huff
*Assistant Examiner* — Boone Alexander Evans
(74) *Attorney, Agent, or Firm* — Sughrue Mion, PLLC

(57) ABSTRACT

A toner collecting device including: a centrifugation cylinder configured to be introduced with an airflow containing a toner and configured to centrifugally separate the toner; an airflow inlet; an airflow outlet; a toner collector that is located at a lower end of the centrifugation cylinder configured to collect the toner separated in the centrifugation cylinder; and a suction unit configured to suction an inside of the centrifugation cylinder through the toner collector and comprising a filtration filter configured to filter out the toner. The ratio of a suction quantity QBD ($m^3$/min) of the airflow suctioned to an introduction quantity Qin ($m^3$/min) at which the airflow containing the toner is introduced is more than 0% and 30% or less. The ratio of a filtration area ($m^2$) of the filtration filter to the suction quantity QBD ($m^3$/min) of the airflow suctioned is 0.4 or more and 4.0 or less.

9 Claims, 2 Drawing Sheets

METHOD FOR PRODUCING TONER

CROSS-REFERENCE TO RELATED APPLICATIONS

This application is based on and claims priority under 35 USC 119 from Japanese Patent Application No. 2022-024961 filed Feb. 21, 2022.

BACKGROUND

(i) Technical Field

The present disclosure relates to a method for producing a toner.

(ii) Related Art

For example, Japanese Unexamined Patent Application Publication No. 6-55102 discloses a "cyclone including: a cyclone cylinder having an opening at a lower end; a gas inlet through which a dusty gas is introduced into the cyclone cylinder to generate a swirling flow; an inner cylinder having an outer diameter smaller than the inner diameter of the cyclone cylinder, disposed along the axis of the cyclone cylinder, and serving as an outlet of clean gas; and a dust collecting chamber disposed to surround the opening at the lower end of the cyclone cylinder and having a dust outlet at a lower part, wherein a diffuser is disposed in the gas inlet or upstream of the gas inlet, and a gas passage connecting a suction port near the entrance of the diffuser and an intake port of the dust collecting chamber is provided such that part of the dusty gas is returned to the gas inlet through the gas passage.

SUMMARY

Aspects of non-limiting embodiments of the present disclosure relate to a method for producing a toner in which method the toner recovery rate is higher and the toner is less likely to aggregate than a method for producing a toner including a toner collecting step of collecting a toner by using a toner collecting device that includes: a centrifugation cylinder to which an airflow containing a toner is introduced and in which the toner is centrifugally separated by a swirling flow caused by the introduced airflow; an airflow inlet through which the airflow containing the toner is introduced to the centrifugation cylinder; an airflow outlet that is located at an upper end of the centrifugation cylinder and through which the airflow from which the toner has been separated in the centrifugation cylinder is discharged; and a toner collector that is located at a lower end of the centrifugation cylinder and in which the toner separated in the centrifugation cylinder is collected, wherein the toner collecting device does not include a suction unit that suctions the inside of the centrifugation cylinder through the toner collector and that has a filtration filter through which the toner in the suctioned airflow is filtered out.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a method for producing a toner, the method including collecting a toner by using a toner collecting device including: a centrifugation cylinder to which an airflow containing a toner is introduced and in which the toner is centrifugally separated by a swirling flow caused by the introduced airflow; an airflow inlet through which the airflow containing the toner is introduced to the centrifugation cylinder; an airflow outlet that is located at an upper end of the centrifugation cylinder and through which the airflow from which the toner has been separated in the centrifugation cylinder is discharged; a toner collector that is located at a lower end of the centrifugation cylinder and in which the toner separated in the centrifugation cylinder is collected; and a suction unit that suctions the inside of the centrifugation cylinder through the toner collector and has a filtration filter through which the toner in the suctioned airflow is filtered out, wherein the ratio of a suction quantity QBD ($m^3$/min) of the airflow suctioned by the suction unit to an introduction quantity Qin ($m^3$/min) at which the airflow containing the toner is introduced to the centrifugation cylinder is more than 0% and 30% or less, and the ratio of a filtration area A ($m^2$) of the filtration filter to the suction quantity QBD ($m^3$/min) of the airflow suctioned by the suction unit is 0.4 or more and 4.0 or less.

BRIEF DESCRIPTION OF THE DRAWINGS

Exemplary embodiments of the present disclosure will be described in detail based on the following figures, wherein.

DETAILED DESCRIPTION

Figure 1:
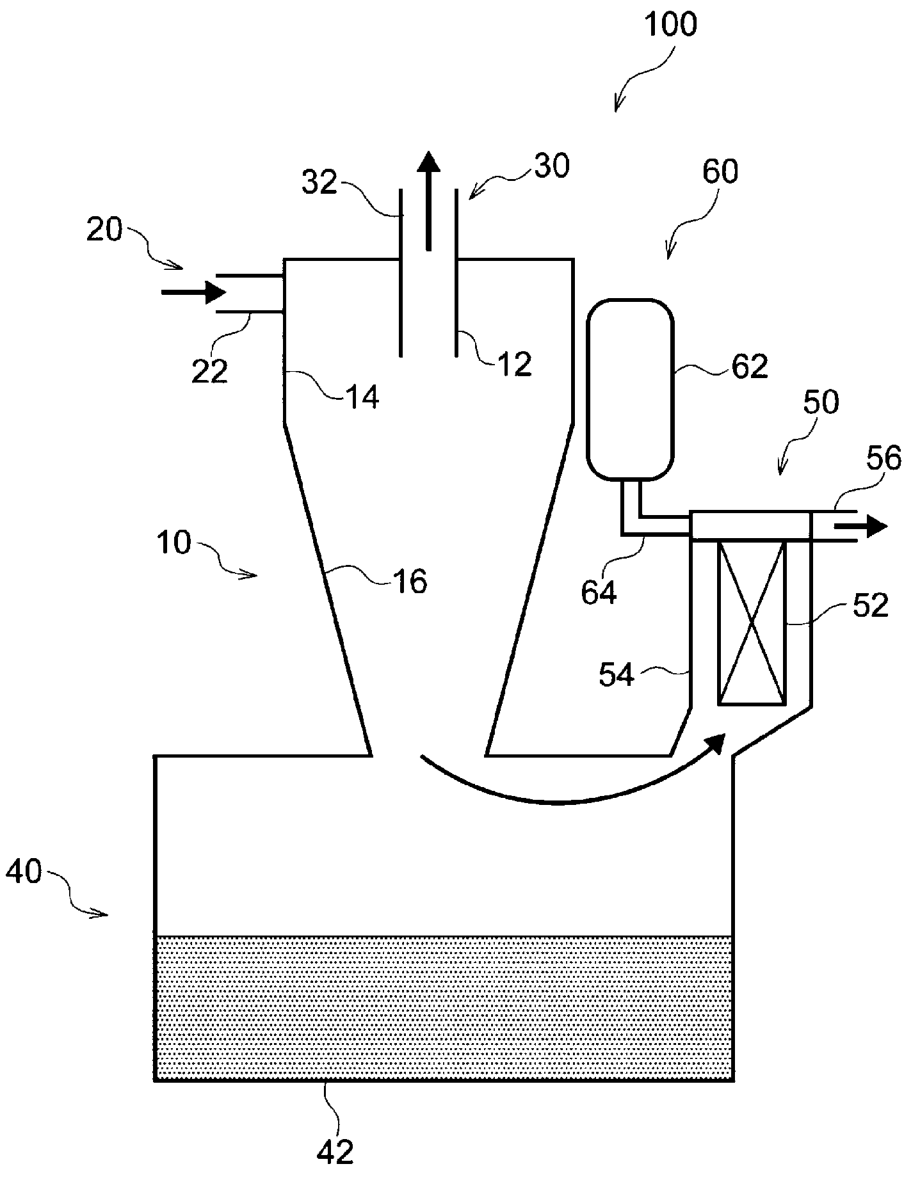
FIG. 1 is a schematic view of an example of a toner collecting device used in a method for producing a toner according to an exemplary embodiment.

Exemplary embodiments of the present disclosure will be described below. The following description and Examples are for illustrating the present disclosure, but are not intended to limit the present disclosure.

A value range expressed by using "to" in the present disclosure indicates a range including the values before and after "to" as the minimum value and the maximum value.

With regard to value ranges described stepwise in this specification, the upper limit or the lower limit of one value range may be replaced by the upper limit or the lower limit of another value range. The upper limit or lower limit of any value range described in the present disclosure may be replaced by a value described in Examples.

In this specification, the term "step" includes not only an independent step but also a step that cannot be clearly distinguished from other steps but may accomplish an intended purpose.

In the description of exemplary embodiments with reference to the drawings in this specification, the configurations of the exemplary embodiments are not limited to the configurations illustrated in the drawings. The sizes of members in each figure are schematic, and the relative relationship between the sizes of the members is not limited to what is illustrated.

In this specification, each component may include two or more corresponding substances. In the present disclosure, the amount of each component in a composition refers to, when there are two or more substances corresponding to each component in the composition, the total amount of the substances present in the composition, unless otherwise specified.

Method for Producing Toner

A method for producing a toner according to an exemplary embodiment (specifically, toner for developing electrostatic charge images) includes a toner collecting step of collecting a toner by using a toner collecting device.

The toner collecting device includes:

a centrifugation cylinder to which an airflow containing a toner is introduced and in which the toner is centrifugally separated by a swirling flow caused by the introduced airflow;

an airflow inlet through which the airflow containing the toner is introduced to the centrifugation cylinder;

an airflow outlet that is located at an upper end of the centrifugation cylinder and through which the airflow from which the toner has been separated in the centrifugation cylinder is discharged;

a toner collector that is located at a lower end of the centrifugation cylinder and in which the toner separated in the centrifugation cylinder is collected; and a suction unit that suctions the inside of the centrifugation cylinder through the toner collector and has a filtration filter through which the toner in the suctioned airflow is filtered out.

The ratio of the suction quantity ($m^3$/min) of the airflow suctioned by the suction unit to the introduction quantity ($m^3$/min) at which the airflow containing the toner is introduced to the centrifugation cylinder is more than 0% and 30% or less.

The ratio of the filtration area ($m^2$) of the filtration filter to the suction quantity ($m^3$/min) of the airflow suctioned by the suction unit is 0.4 or more and 4.0 or less.

In the method for producing a toner according to the exemplary embodiment, the toner recovery rate is high, and the toner is unlikely to aggregate. The reason for this is assumed as described below.

Since the toner is transported through air between the steps in the process for producing the toner, the toner collecting device using centrifugation is used to collect the toner.

The toner collecting device cannot completely separate the toner from air, and the toner that has not been collected by the toner collecting device is collected on a dust collecting filter installed in an exhaust pipe of the toner collecting device. However, the recovery rate through the dust collecting filter is low, and it thus takes time and cost to recycle. There is therefore a need to improve the performance and efficiency of the toner collecting device itself.

In view of this point, the toner collecting device may have a mechanism in which airflow discharged from centrifugation is circulated and centrifuged again in order to improve recovery performance (e.g., PTL 1).

However, circulation of airflow discharged from centrifugation may cause fusion of the toner inside the circulation path.

In the method for producing a toner according to the exemplary embodiment, a specific suction quantity of air inside the centrifugation cylinder is suctioned by the suction unit through the toner collector to generate airflow on the inner wall side of the centrifugation cylinder toward the toner collector. The centrifugation capacity is thus improved to reduce the amount of toner contained in the airflow discharged from the airflow outlet, improving the toner recovery rate.

When a filtration filter is installed in the suction unit, the toner contained in the airflow suctioned by the suction unit is filtered out through the filtration filter. The filtered-out matter is further collected to improve the toner recovery rate.

If the filtration area of the filtration filter is too small, the toner may aggregate as a result of the filtration filter applying friction and pressure to the toner when the toner is filtered out through the filtration filter. The reason why the toner aggregates is that external additives are separated due to the friction on the toner or external additives are buried due to the pressure on the toner.

If the filtration area of the filtration filter is too large, the amount of filtered-out matter may be reduced, and the toner recovery rate may be reduced.

When the ratio of the filtration area ($m^2$) of the filtration filter to the suction quantity ($m^3$/min) of the airflow suctioned by the suction unit is in the range described above, the friction and pressure applied to the toner may be reduced while the toner recovery rate is maintained. This may prevent or reduce generation of toner aggregates.

In addition, the airflow suctioned by the suction unit is not circulated in the toner collecting device. This may prevent or reduce generation of toner aggregates.

From the above reasons, the toner recovery rate may be high, and the toner may be unlikely to aggregate in the method for producing a toner according to the exemplary embodiment.

In the method for producing a toner according to the exemplary embodiment, the toner collecting device may have a backwashing unit that backwashes the filtration filter.

When the filtration filter is backwashed in the backwashing unit, the toner filtered out through the filtration filter is separated from the filtration filter and collected in the toner collector, which may further improve the toner recovery efficiency. In addition, the frequency of exchange of the filtration filter may be reduced, and the toner collecting device may operate continuously.

The method for producing a toner according to the exemplary embodiment will be described below in detail.

First, an example of the toner collecting device using the method for producing a toner according to the exemplary embodiment will be described.

A toner collecting device 100 shown in FIG. 1 includes, for example, a centrifugation cylinder 10, an airflow inlet 20, an airflow outlet 30, a toner collector 40, a suction unit 50, and a backwashing unit 60.

The backwashing unit 60 is an optional component and may not be installed in the toner collecting device 100.

The centrifugation cylinder 10 is a centrifugation cylinder to which an airflow containing a toner is introduced and in which the toner is centrifugally separated by a swirling flow caused by the introduced airflow.

The centrifugation cylinder 10 has an inner cylinder 12, an outer cylinder 14 outside the inner cylinder, and a conical cylinder 16 connected to the lower end of the outer cylinder 14. The centrifugation cylinder 10 is coaxial with the inner cylinder 12, the outer cylinder 14, and the conical cylinder 16.

The airflow inlet 20 is an airflow inlet through which the airflow containing the toner is introduced to the centrifugation cylinder.

The airflow inlet 20 has an airflow inlet tube 22 connected to the outer cylinder 14 of the centrifugation cylinder 10.

The airflow outlet 30 is an airflow outlet that is located at the upper end of the centrifugation cylinder and through which the airflow from which the toner has been separated in the centrifugation cylinder is discharged.

The airflow outlet 30 has an airflow outlet tube 32 connected to the upper end of the inner cylinder of the centrifugation cylinder 10.

The toner collector 40 is located at the lower end of the centrifugation cylinder 10 and collects the toner that has been separated in the centrifugation cylinder.

The toner collector 40 has a collecting box 42 connected to the lower end of the conical cylinder 16 of the centrifugation cylinder 10.

The suction unit 50 is a suction unit that suctions the inside of the centrifugation cylinder 10 through the toner collector 40 and has a filtration filter 52 (e.g., bag filter) through which the toner in the suctioned airflow is filtered out.

The suction unit 50 has a filter cylinder 54 and an outlet tube 56 through which the airflow that has passed through the filter cylinder 54 is discharged. The filter cylinder 54 is connected to an upper part of the collecting box 42 at a position of the collecting box 42 of the toner collector 40, the position being away from the central axis of the conical cylinder 16 of the centrifugation cylinder 10.

The cylindrical filtration filter 52 is disposed in the filter cylinder 54. The airflow suctioned by the suction unit is discharged through the outlet tube 56 after the toner is filtered out through the filtration filter 52.

Although not shown, a suction pump (not shown) is connected to the outlet tube 56, and the inside of the centrifugation cylinder 10 is suctioned by the suction pump through the toner collector 40.

The backwashing unit 60 backwashes the filtration filter 52.

The backwashing unit 60 has a gas injector 62 that injects gas and a guide pipe 64 that guides the gas injected from the gas injector 62.

An end of the guide pipe 64 that injects the guided gas is disposed inside the cylindrical filtration filter 52. The gas guided by the guide pipe 64 is injected from the inside toward the outside of the cylindrical filtration filter 52.

Next, each step in the method for producing a toner according to the exemplary embodiment will be described.

The method for producing a toner according to the exemplary embodiment includes a toner collecting step of collecting a toner by using the toner collecting device.

The toner collected in the toner collecting step is, for example, a toner having external additives externally added to toner particles, or a toner transported through airflow after production of the toner before external addition of external additives to toner particles.

Specifically, the toner collecting step is performed, for example, as described below.

In the toner collecting device 100 shown in FIG. 1, an airflow containing a toner (i.e., a toner transported through airflow) is introduced to the outer cylinder 14 of the centrifugation cylinder 10 through the airflow inlet 20. At this time, the airflow containing the toner is introduced so as to generate a swirling flow (i.e., cyclone) inside the centrifugation cylinder 10.

In the centrifugation cylinder 10, a swirling flow is generated from the outer cylinder 14 toward the conical cylinder 16 so that the toner in the airflow is separated by the centrifugal force of the swirling flow. The separated toner falls on the inner wall side of the centrifugation cylinder 10 by its own weight and is collected in the collecting box 42 of the toner collector 40.

The airflow from which the toner has been separated in the centrifugation cylinder 10 is discharged from the airflow outlet tube 32 of the airflow outlet 30 through the inner cylinder 12.

While the airflow containing the toner is introduced to the outer cylinder 14 of the centrifugation cylinder 10 from the airflow inlet tube 22 of the airflow inlet 20, the suction unit 50 suctions the inside of the centrifugation cylinder 10 through the toner collector 40.

When the suction unit 50 suctions the inside of the centrifugation cylinder 10, airflow is generated on the inner wall side of the centrifugation cylinder 10 toward the toner collector 40. This may increase the centrifugation capacity.

The airflow suctioned by the suction unit 50 is filtered through the cylindrical filtration filter 52 disposed inside the filter cylinder 54.

The airflow that has been filtered through the filtration filter 52 is discharged through the outlet tube 56.

In the backwashing unit 60, the gas injected from the gas injector 62 is injected from the inside toward the outside of the cylindrical filtration filter 52 through the guide pipe 64. The filtered-out matter (i.e., toner) on the filtration filter 52 is accordingly removed from the filtration filter 52. The removed filtered-out matter (i.e., toner) falls into the collecting box 42 of the toner collector 40 and is collected in the collecting box 42.

In the toner collecting step, the toner collecting device captures and collects, for example, the toner that has been transported through airflow.

In the toner collecting device 100, the ratio (QBD/Qin) of the suction quantity QBD ($m^3$/min) of the airflow suctioned by the suction unit 50 to the introduction quantity Qin ($m^3$/min) at which the airflow containing the toner is introduced to the centrifugation cylinder 10 is more than 0% and 30% or less.

When the ratio (QBD/Qin) is in the range described above, the airflow may be generated at a high flow rate on the inner wall side of the centrifugation cylinder 10 toward the toner collector 40 to increase the centrifugation capacity. This may improve the toner recovery rate.

To improve the toner recovery rate, the ratio (QBD/Qin) is preferably 1% or higher and 20% or lower, more preferably 2% or higher and 10% or lower.

The introduction quantity Qin at which the airflow containing the toner is introduced to the centrifugation cylinder 10 is preferably 3 $m^3$/min or more and 100 $m^3$/min or less, more preferably 10 $m^3$/min or more and 50 $m^3$/min or less.

The suction quantity QBD of the airflow suctioned by the suction unit 50 is preferably 1 $m^3$/min or more and 30 $m^3$/min or less, more preferably 3 $m^3$/min or more and 15 $m^3$/min or less.

The discharge quantity Qout of the airflow discharged through the airflow outlet 30 is the introduction quantity Qin−the suction quantity QBD.

The introduction quantity Qin ($m^3$/min) is measured at the airflow introduction position of the centrifugation cylinder 10 (i.e., joint between the airflow inlet tube 22 of the airflow inlet 20 and the outer cylinder 14 of the centrifugation cylinder 10) by using a flow meter.

The suction quantity QBD ($m^3$/min) is measured in the outlet tube 56 of the suction unit 50.

The ratio (A/QBD) of the filtration area A ($m^2$) of the filtration filter 52 to the suction quantity QBD ($m^3$/min) of the airflow suctioned by the suction unit is 0.4 or more and 4.0 or less.

When the ratio (A/QBD) is in the range described above, the friction and pressure applied to the toner may be reduced while the toner recovery rate is maintained. This may prevent or reduce generation of toner aggregates.

To improve the toner recovery rate and prevent or reduce generation of toner aggregates, the ratio (A/QBD) is preferably 0.5 or higher and 3.5 or lower, more preferably 1 or higher and 3 or lower.

The introduction quantity Qin ($m^3$/min) at which the airflow containing the toner is introduced to the centrifugation cylinder 10 and the inner diameter d (m) of the centrifugation cylinder 10 at the airflow introduction position preferably satisfy $5 \leq Qin/d^2 \leq 500$, more preferably satisfy $50 \leq Qin/d^2 \leq 300$.

When the introduction quantity Qin and the inner diameter d satisfy $5 \leq Qin/d^2 \leq 500$, a strong swirling flow may be generated in the centrifugation cylinder 10 while the friction and pressure applied to the toner is reduced. It may thus be easy to improve the toner recovery rate, and it may be difficult to generate toner aggregates.

The inner diameter of the centrifugation cylinder 10 at the airflow introduction position refers to the opening diameter of the joint between the airflow inlet tube 22 of the airflow inlet 20 and the outer cylinder 14 of the centrifugation cylinder 10. The inner diameter of the centrifugation cylinder 10 at the airflow introduction position is an average value of the maximum diameter and the minimum diameter.

The suction quantity QBD ($m^3$/min) of the airflow suctioned by the suction unit 50 and the inner diameter d (m) of the centrifugation cylinder 10 at the airflow introduction position preferably satisfy $0 < QBD/d^2 \leq 150$, more preferably $10 < QBD/d^2 \leq 50$.

When the suction quantity QBD and the inner diameter d satisfy $0 < QBD/d^2 \leq 150$, the suction power for suctioning the inside of the centrifugation cylinder 10 may be increased while the friction and pressure applied to the toner is reduced. It may thus be easy to improve the toner recovery rate, and it may be difficult to generate toner aggregates.

The filtration area A ($m^2$) of the filtration filter 52 and the inner diameter d (m) of the centrifugation cylinder 10 at the airflow introduction position preferably satisfy $0.5 \leq A/d^2 \leq 100$, more preferably $10 \leq A/d^2 \leq 50$.

When the filtration area A and the inner diameter d satisfy $0.5 \leq A/d^2 \leq 100$, the suction power for suctioning the inside of the centrifugation cylinder 10 may be increased while the friction and pressure applied to the toner is reduced. It may thus be easy to improve the toner recovery rate, and it may be difficult to generate toner aggregates.

The washing frequency at which the backwashing unit 60 backwashes the filtration filter is preferably 0.5 times/min or more, more preferably 0.8 times/min or more.

When the washing frequency is in the range described above, the friction and pressure applied to the toner as a result of an increase in the amount of toner deposited on the filtration filter 52 may be reduced, and it may be easy to prevent or reduce generation of toner aggregates.

The upper limit of the washing frequency may be 1 time/min or lower. This is because a high frequency of backwashing may reduce the suction ability of the suction unit in suctioning the inside of the centrifugation cylinder through the toner collector to lower the recovery efficiency.

The difference between the internal and external pressures of the filtration filter 52 is preferably more than 0 KPa and 0.5 KPa or less, more preferably 0.1 KPa or more and 0.4 KPa or less.

When the difference between the internal and external pressures of the filtration filter 52 is in the range described above, the toner filtered through the filtration filter 52 may be unlikely to adhere, and the filtration filter 52 may be backwashed while the amount of gas injected by the backwashing unit 60 is reduced. In addition, the friction and pressure applied to the toner filtered through the filtration filter 52 may be reduced. It may thus be easy to prevent or reduce generation of toner aggregates.

The internal and external pressures of the filtration filter 52 are measured at positions before and after the filter.

When the inner diameter (m) of the centrifugation cylinder 10 at the airflow introduction position is denoted by d, the distance D (see FIG. 2) from the center of the joint between the centrifugation cylinder 10 and the toner collector 40 to the center of the joint between the toner collector 40 and the suction unit 50 is preferably 0.3d or longer and 1.5d or shorter, more preferably 0.5d or longer and 1.2d or shorter.

When the distance D is in the range described above, the suction unit 50 may easily produce airflow on the inner wall side of the centrifugation cylinder 10 toward the toner collector without disturbing the swirling flow generated in the centrifugation cylinder 10. This may increase the toner centrifugation performance and may easily improve the toner recovery rate.

The center of the joint between the centrifugation cylinder 10 and the toner collector 40 refers to a position along the central axis on the lower end of the conical cylinder 16 of the centrifugation cylinder 10, the lower end being connected to the toner collector 40.

The center of the joint between the toner collector 40 and the suction unit 50 refers to a position along the central axis on the lower end of the filter cylinder 54 of the suction unit 50, the lower end being connected to the toner collector 40.

The aperture diameter B of the joint between the toner collector 40 and the suction unit 50 is preferably 0.3d or more and 1.5d or less, more preferably 0.5d or more and 1.2d or less.

When the aperture diameter B is in the range described above, the suction quantity of the airflow suctioned by the suction unit 50 may be increased while swirling of the toner powder collected in the toner collector 40 is suppressed. As a result, the toner recovery rate may tend to increase.

The aperture diameter B of the joint between the toner collector 40 and the suction unit 50 refers to the opening diameter at the lower end of the filter cylinder 54 of the suction unit 50, the lower end being connected to the toner collector 40. The aperture diameter B is an average value of the maximum diameter and the minimum diameter.

Next, a toner targeted for the toner collecting step (hereinafter also referred to as a toner according to an exemplary embodiment) in the method for producing a toner according to the exemplary embodiment will be described.

The toner according to the exemplary embodiment contains toner particles and, as desired, external additives.

Toner Particles

The toner particles contain, for example, a binder resin and, as desired, a colorant, a release agent, and other additives.

Binder Resin

Examples of the binder resin include vinyl resins composed of a homopolymer of a monomer or a copolymer of two or more monomers selected from, for example, styrenes (e.g., styrene, p-chlorostyrene, α-methylstyrene), (meth) acrylic acid esters (e.g., methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate), ethylenically unsaturated nitriles (e.g., acrylonitrile, methacrylonitrile), vinyl ethers (e.g., vinyl methyl ether, vinyl isobutyl ether), vinyl ketones (e.g., vinyl methyl ketone, vinyl ethyl ketone, vinyl isopropenyl ketone), and olefins (e.g., ethylene, propylene, butadiene).

Examples of the binder resin further include non-vinyl resins, such as epoxy resins, polyester resins, polyurethane resins, polyamide resins, cellulose resins, polyether resins, and modified rosins; and mixtures of these non-vinyl resins and the above vinyl resins, and graft polymers produced by polymerization of a vinyl monomer in the presence of these non-vinyl resins.

These binder resins may be used alone or in combination of two or more.

The binder resin may be a polyester resin.

Examples of the polyester resin include known polyester resins.

The amount of the binder resin with respect to the total mass of the toner particles is, for example, preferably 40 mass % or more and 95 mass % or less, more preferably 50 mass % or more and 90 mass % or less, still more preferably 60 mass % or more and 85 mass % or less.

Colorant

Examples of the colorant include various pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and various dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more.

The colorant may be surface-treated as desired, or may be used in combination with a dispersant. Two or more colorants may be used in combination.

The amount of the colorant with respect to the total mass of the toner particles is, for example, preferably 1 mass % or more and 30 mass % or less, more preferably 3 mass % or more and 15 mass % or less.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these.

The melting temperature of the release agent is preferably 50° C. or higher and 110° C. or lower, more preferably 60° C. or higher and 100° C. or lower.

The melting temperature is determined from the differential scanning calorimetry (DSC) curve obtained by DSC in accordance with "melting peak temperature" described in the method for determining the melting temperature in JIS K 7121-1987 "Testing Methods for Transition Temperatures of Plastics".

The amount of the release agent with respect to the entire toner particles is, for example, preferably 1 mass % or more and 20 mass % or less, more preferably 5 mass % or more and 15 mass % or less.

Other Additives

Examples of other additives include well-known additives, such as magnetic substances, charge control agents, and inorganic powders. These additives are internal additives contained in the toner particles.

Properties of Toner Particles and Like

The toner particles may be toner particles having a single-layer structure, or may be toner particles each having so-called a core-shell structure including a core (core particle) and a coating layer (shell layer) coating the core.

The toner particles having a core-shell structure include, for example, a core containing a binder resin and other optional additives, such as a colorant and a release agent, and a coating layer containing a binder resin.

The volume-average particle size (D50v) of the toner particles is preferably 2 μm or more and 10 μm or less, more preferably 4 μm or more and 8 μm or less.

The average particle sizes and particle size distribution indexes of the toner particles are measured by using Coulter Multisizer II (available from Beckman Coulter, Inc.) and an electrolyte ISOTON-II (available from Beckman Coulter, Inc.).

Before measurement, 0.5 mg or more and 50 mg or less of a test sample is added to 2 ml of a 5% aqueous solution of a surfactant (e.g., sodium alkylbenzene sulfonate) serving as a dispersant. The resulting mixture is added to 100 ml or more and 150 ml or less of the electrolyte.

The electrolyte in which the sample is suspended is dispersed by using an ultrasonic disperser for 1 minute, and the particle size distribution of particles having a particle size in the range of 2 μm or more and 60 μm or less is measured by using Coulter Multisizer II having an aperture with a diameter of 100 μm. The number of sampled particles is 50,000.

The volume-based and number-based cumulative distributions are drawn from the smallest particle size against particle size ranges (channels) divided on the basis of the measured particle size distribution. The particle sizes at a cumulative percentage of 16% are defined as a volume particle size D16v and a number particle size D16p, the particle sizes at a cumulative percentage of 50% as a volume-average particle size D50v and a cumulative number-average particle size D50p, and the particle sizes at a cumulative percentage of 84% as a volume particle size D84v and a number particle size of D84p.

From these particle sizes, the volume particle size distribution index (GSDv) is calculated as $(D84v/D16v)^{1/2}$, and the number particle size distribution index (GSDp) as $(D84p/D16p)^{1/2}$.

The average circularity of the toner particles is preferably 0.94 or more and 1.00 or less, more preferably 0.95 or more and 0.98 or less.

The average circularity of the toner particles is obtained from (the circle equivalent circumference)/(the circumference)[(the circumference of a circle having the same projected area as the particle image)/(the circumference of the projected particle image)]. Specifically, the average circularity of the toner particles is determined by the following method.

First, the toner particles to be analyzed are collected by suction to form a flat flow, and particle images are captured with stroboscopic flash as still images, and the particle images are analyzed with a flow particle image analyzer (FPIA-3000 available from Sysmex Corporation) to determine the average circularity. The number of samples used to determine the average circularity is 3,500.

When the toner has external additives, the toner (developer) to be analyzed is dispersed in surfactant-containing water, and the external additives are then removed by ultrasonication to form toner particles.

External Additives

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, dipping the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more.

The amount of the hydrophobizing agent is normally, for example, 1 part by mass or more and 10 parts by mass or less with respect to 100 parts by mass of the inorganic particles.

Examples of external additives further include resin particles (resin particles made of, for example, polystyrene, polymethyl methacrylate (PMMA), and melamine resin), and cleaning active agents (e.g., higher fatty acid metal salts, such as zinc stearate, and fluoropolymer particles).

The amount of external additives externally added is, for example, preferably 0.01 mass % or more and 5 mass % or less, more preferably 0.01 mass % or more and 2.0 mass % or less with respect to the toner particles.

Method for Producing Toner

Next, a method for producing a toner according to an exemplary embodiment will be described.

The toner according to the exemplary embodiment is obtained by externally adding external additives to toner particles after producing the toner particles.

The toner particles may be produced by using any one of dry production methods (e.g., a kneading-grinding method) and wet production methods (e.g., an aggregation-coalescence method, a suspension-polymerization method, and a dissolution-suspension method). The method for producing the toner particles is not limited to these production methods, and a well-known production method is employed.

Of these methods, an aggregation-coalescence method may be used to produce the toner particles.

Specifically, for example, when the toner particles are produced by using an aggregation-coalescence method, the toner particles are produced through the following steps: a step (resin particle dispersion-preparing step) of preparing a resin particle dispersion containing resin particles, or a binder resin, dispersed therein; a step (aggregated particle-forming step) of forming aggregated particles by aggregating the resin particles (and other particles as desired) in the resin particle dispersion (in a dispersion after addition of other particle dispersion as desired); and a step (fusing-coalescing step) of forming toner particles by heating an aggregated particle dispersion containing the aggregated particles dispersed therein to cause fusion and coalescence of the aggregated particles.

The details of each step will be described below. The following description provides a method for producing toner particles containing a colorant and a release agent, but the colorant and the release agent are used as desired. Additives other than the colorant and the release agent may be used.

Resin Particle Dispersion-Preparing Step

First, a resin particle dispersion containing resin particles, or a binder resin, dispersed therein is prepared together with, for example, a colorant particle dispersion containing colorant particles dispersed therein and a release agent particle dispersion containing release agent particles dispersed therein.

The resin particle dispersion is prepared by, for example, dispersing the resin particles in a dispersion medium by using a surfactant.

Examples of the dispersion medium used in the resin particle dispersion include aqueous media.

Examples of aqueous media include water, such as distilled water and ion exchange water, and alcohols. These aqueous media may be used alone or in combination of two or more.

Examples of the surfactant include anionic surfactants, such as sulfate ester salts, sulfonate salts, phosphate esters, and soaps; cationic surfactants, such as amine salts and quaternary ammonium salts; and non-ionic surfactants, such as polyethylene glycols, alkylphenol ethylene oxide adducts, and polyhydric alcohols. Of these surfactants, in particular, anionic surfactants and cationic surfactants may be used. A non-ionic surfactant may be used in combination with an anionic surfactant or a cationic surfactant.

The surfactant may be used alone or in combination of two or more.

Examples of the method for dispersing resin particles in a dispersion medium to prepare the resin particle dispersion include ordinary dispersion methods using, for example, a rotary shear homogenizer, a ball mill having media, a sand mill, and Dyno-Mill. Depending on the type of resin particles, for example, the phase-inversion emulsification method may be used to disperse resin particles in a resin particle dispersion.

The phase-inversion emulsification method is a method for dispersing a resin in the form of particles in an aqueous medium. This method involves dissolving a target resin in a hydrophobic organic solvent capable of dissolving the resin; adding a base to an organic continuous phase (O phase) to cause neutralization; and then adding an aqueous medium (W phase) to cause resin conversion (so called phase inversion) from W/O to O/W, forming a discontinuous phase.

The volume-average particle size of resin particles dispersed in the resin particle dispersion is preferably, for example, 0.01 μm or more and 1 μm or less, more preferably 0.08 μm or more and 0.8 μm or less, still more preferably 0.1 μm or more and 0.6 μm or less.

The volume-average particle size of the resin particles is determined as follows: drawing the volume-based cumulative distribution from the smallest particle size as a function of divided particle size ranges (channels) of the particle size distribution measured with a laser diffraction particle size distribution analyzer (e.g., LA-700 available from Horiba Ltd.); and defining the particle size at 50% cumulative volume with respect to all particles as a volume-average particle size D50v. The volume-average particle size of the particles in other dispersions is measured similarly.

The amount of the resin particles contained in the resin particle dispersion is, for example, preferably 5 mass % or more and 50 mass % or less, more preferably 10 mass % or more and 40 mass % or less.

Similarly to the resin particle dispersion, for example, the colorant particle dispersion and the release agent particle dispersion are also prepared. Specifically, the volume-average particle size of the particles, the dispersion medium, the dispersion method, and the amount of the particles for the resin particle dispersion are the same as those for the colorant particles dispersed in the colorant particle dispersion and the release agent particles dispersed in the release agent particle dispersion.

Aggregated Particle-Forming Step

Next, the resin particle dispersion is mixed with the colorant particle dispersion and the release agent particle dispersion.

The resin particles, the colorant particles, and the release agent particles are subjected to hetero-aggregation in the mixed dispersion to form aggregated particles having a size close to the intended toner particle size and containing the resin particles, the colorant particles, and the release agent particles.

Specifically, the aggregated particles are formed, for example, as follows: adding an aggregating agent to the mixed dispersion and adjusting the pH of the mixed dispersion to the acidic side (e.g., pH 2 or higher and pH 5 or lower), and adding a dispersion stabilizer as desired; and then heating the mixed dispersion to the glass transition temperature of the resin particles (specifically, for example, the glass transition temperature of the resin particles −30° C. or higher and the glass transition temperature −10° C. or lower) to cause aggregation of the particles dispersed in the mixed dispersion.

The aggregated particle-forming step may involve, for example, adding the aggregating agent to the mixed dispersion at room temperature (e.g., 25° C.) under stirring with a rotary shear homogenizer and adjusting the pH of the mixed dispersion to the acidic side (e.g., pH 2 or higher and pH 5 or lower), and heating the mixed dispersion as described above after adding a dispersion stabilizer as desired.

Examples of the aggregating agent include surfactants having polarity opposite to the polarity of the surfactant used as a dispersant added to the mixed dispersion, inorganic metal salts, and divalent or higher valent metal complexes. In particular, the use of a metal complex as an aggregating agent may reduce the amount of the surfactant used and may improve charging characteristics.

An additive that forms a complex or a similar bond with the metal ion of the aggregating agent may be used as desired. The additive may be a chelator.

Examples of inorganic metal salts include metal salts, such as calcium chloride, calcium nitrate, barium chloride, magnesium chloride, zinc chloride, aluminum chloride, and aluminum sulfate; and inorganic metal salt polymers, such as polyaluminum chloride, polyaluminum hydroxide, and calcium polysulfide.

The chelator may be a water-soluble chelator. Examples of the chelator include oxycarboxylic acids, such as tartaric acid, citric acid, and gluconic acid; and iminodiacetic acid (IDA), nitrilotriacetic acid (NTA), and ethylenediaminetetraacetic acid (EDTA).

The amount of the chelator added is, for example, preferably 0.01 parts by mass or more and 5.0 parts by mass or less, more preferably 0.1 parts by mass or more and less than 3.0 parts by mass, with respect to 100 parts by mass of the resin particles.

Fusing-Coalescing Step

Next, the aggregated particle dispersion containing the aggregated particles dispersed therein is heated to, for example, a temperature not lower than the glass transition temperature of the resin particles (e.g., a temperature higher than the glass transition temperature of the resin particles by 10° C. to 30° C., or higher) to cause fusion and coalescence of the aggregated particles and thus to form toner particles.

The toner particles are produced through the steps described above.

The toner particles may be produced through the following steps: a step of forming secondary aggregated particles by preparing an aggregated particle dispersion containing aggregated particles dispersed therein and then mixing the aggregated particle dispersion and a resin particle dispersion containing resin particles dispersed therein to cause aggregation such that the resin particles adhere to the surfaces of the aggregated particles; and a step of fusing and coalescing the secondary aggregated particles into toner particles having a core-shell structure by heating a secondary aggregated particle dispersion containing the secondary aggregated particles dispersed therein.

After completion of the fusing-coalescing step, the toner particles formed in the solution are subjected to a known washing step, a known solid-liquid separation step, and a known drying step to produce dry toner particles.

The washing step may involve sufficient displacement washing with ion exchange water in view of charging characteristics. The solid-liquid separation step is not limited and may involve, for example, suction filtration or pressure filtration in view of productivity. The drying step is not limited and may involve, for example, freeze drying, flush drying, fluidized bed drying, or vibratory fluidized bed drying in view of productivity.

The toner according to the exemplary embodiment is produced by, for example, adding external additives to the obtained dry toner particles and mixing them. Mixing may be performed with, for example, a V-blender, a Henschel mixer, or a Lodige mixer. In addition, coarse toner particles may be removed with a vibratory sieving machine, a wind power sieving machine, or other machines, as desired.

Examples

Examples of the present disclosure will be described below, but the present disclosure is not limited to the following Examples. In the following description, the units "part" and "%" are both on a mass basis, unless otherwise specified.

Examples 1 to 17 and Comparative Examples 1 to 4

Preparation of Amorphous Polyester Resin Dispersion (1)

Terephthalic acid: 70 parts

Fumaric acid: 30 parts

Ethylene glycol: 44 parts 1,5-Pentanediol: 47 parts

The materials described above are placed in a 5-L flask equipped with a stirrer, a nitrogen inlet tube, a temperature sensor, and a fractionating column. The mixture is heated to 220° C. over 1 hour under nitrogen gas flow. One part of dibutyltin oxide is added to 100 parts of the total of the above materials. While generated water is distilled off, the mixture is heated to 240° C. over 0.5 hours, and the dehydration condensation reaction continues at 240° C. for 1 hour. The reaction product is then cooled. A polyester resin having a weight-average molecular weight of 95,000 and a glass transition temperature of 62° C. is synthesized accordingly. In a container equipped with a temperature controlling unit and a nitrogen purging unit, 40 parts of ethyl acetate and 25 parts of 2-butanol are placed to prepare a solvent mixture, and 100 parts of the polyester resin is then gradually added and dissolved in the solvent mixture. To the obtained solution, a 10 mass % aqueous ammonia solution (in an amount corresponding to three times the acid value of the resin in terms of molar ratio) is added, and the mixture is stirred for 30 minutes. Next, the container is purged with dry nitrogen, and the temperature is held at 40° C. To the mixture, 400 parts of ion exchange water is added dropwise at a rate of 2 parts/min under stirring to form an emulsion. After completion of dropwise addition, the emulsion is returned to 25° C. A resin particle dispersion in which resin particles having a volume-average particle size of 200 nm are dispersed is obtained accordingly. The solid content of the resin particle dispersion is adjusted to 20 mass % by addition of ion exchange water to provide an amorphous polyester resin dispersion (A1).

Preparation of Crystalline Polyester Resin Dispersion (1)

Dimethyl sebacate: 97 parts

Sodium dimethyl 5-sulphonatoisophthalate: 3 parts

Ethylene glycol: 100 parts

Dibutyltin oxide (catalyst): 0.3 parts by mass

The components described above are placed in a heat-dried three-necked flask, and the air in the container is replaced with nitrogen gas by vacuum operation to form an inert atmosphere. The mixture is stirred and refluxed at 180° C. for 5 hours by machinery stirring. Next, the mixture is then gradually heated to 230° C. under reduced pressure and stirred for 2 hours. The mixture is then air-cooled to terminate the reaction when becoming viscous to provide a crystalline polyester resin B1. The weight-average molecular weight (Mw) of the obtained "crystalline polyester resin B1" is 9700 as determined by molecular weight measurement (based on polystyrene), and the melting temperature of the "crystalline polyester resin B1" is 84° C. Ninety parts by mass of the obtained crystalline polyester resin B1, 1.8 parts by mass of ionic surfactant Neogen RK (DKS Co. Ltd.), and 210 parts by mass of ion exchange water are heated to 100° C. The mixture is dispersed by using ULTRA-TURRAX T50 available from IKA, and then further dispersed by using a pressure discharge Gaulin homogenizer for 1 hour to form a crystalline polyester resin dispersion (1) having a volume-average particle size of 200 nm and having 20 parts by mass of solid content.

Preparation of Colorant Particle Dispersion (1)

Carbon black (Regal 1330 available from Cabot Corporation): 50 parts

Ionic surfactant Neogen RK (available from DKS Co. Ltd.): 10 parts

Ion exchange water: 192.9 parts

The components described above are mixed and processed at 240 MPa by using Ultimaizer (available from Sugino Machine Limited) for 10 minutes to prepare a black colorant particle dispersion (solid concentration: 20 mass %).

Preparation of Release Agent Particle Dispersion (1)

Paraffin wax (HNP-9 available from Nippon Seiro Co., Ltd.): 100 parts

Anionic surfactant (Neogen RK available from DKS Co. Ltd.): 1 part

Ion exchange water: 350 parts

The materials described above are mixed and heated to 100° C. The mixture is dispersed by using a homogenizer (ULTRA-TURRAX T50 available from IKA) and then dispersed by using a Manton-Gaulin high-pressure homogenizer (available from Gaulin Corporation) to form a release agent particle dispersion (solid content 20 mass %) in which release agent particles with a volume-average particle size of 200 nm are dispersed.

Preparation of Toner and Developer

Ion exchange water: 200 parts

Amorphous polyester resin dispersion (1): 150 parts

Crystalline polyester resin dispersion (1): 10 parts

Black colorant particle dispersion: 15 parts

Release agent particle dispersion: 10 parts

Anionic surfactant (TaycaPower): 2.8 parts

The materials described above are placed in a round stainless steel flask. The mixture is adjusted to pH 3.5 by addition of 0.1N nitric acid, and an aluminum sulfate aqueous solution in which 2.0 parts of aluminum sulfate is dissolved in 30 parts of ion exchange water is then added. The mixture is dispersed at 30° C. by using a homogenizer (ULTRA-TURRAX T50 available from IKA), and the dispersion is then heated to 45° C. in a heating oil bath and held until the volume-average particle size reaches 4.8 μm. Next, 60 parts of the amorphous polyester resin particle dispersion (A1) is added, and the mixture is held for 30 minutes. Next, 60 parts of the amorphous polyester resin particle dispersion (1) is further added when the volume-average particle size reaches 5.2 μm, and the mixture is held for 30 minutes. Subsequently, 20 parts of 10 mass % NTA (nitrilotriacetic acid) metal salt aqueous solution (Chelest 70 available from Chelest Corporation) is added, and the mixture is then adjusted to pH 9.0 by using a 1N sodium hydroxide aqueous solution. Next, 1.0 part of anionic activator (TaycaPower) is added, and the mixture is heated to 85° C. under stirring and held for 5 hours. Subsequently, the mixture is cooled to 20° C. at a rate of 20° C./min. The mixture is adjusted to pH 9.5 by using a 1N sodium hydroxide aqueous solution within 60 minutes after cooling. After pH adjustment, the mixture is filtered, washed well with ion exchange water, and dried to provide toner particles having a volume-average particle size of 5.9 μm and an average circularity of 0.97.

A mixture of 100 parts of the toner particles and 1.5 parts of hydrophobic silica (RY50 available from Nippon Aerosil Co., Ltd.) are mixed by using a sample mill at a rotational speed of 10,000 rpm for 30 seconds. Next, the mixture is sieved by using a wind power sieving machine Hi-BOLTER 300 (available from TOYO HITEC Co., LTD., feed rate 600 kg/h, mesh size 38 μm) to provide a toner.

Figure 2:
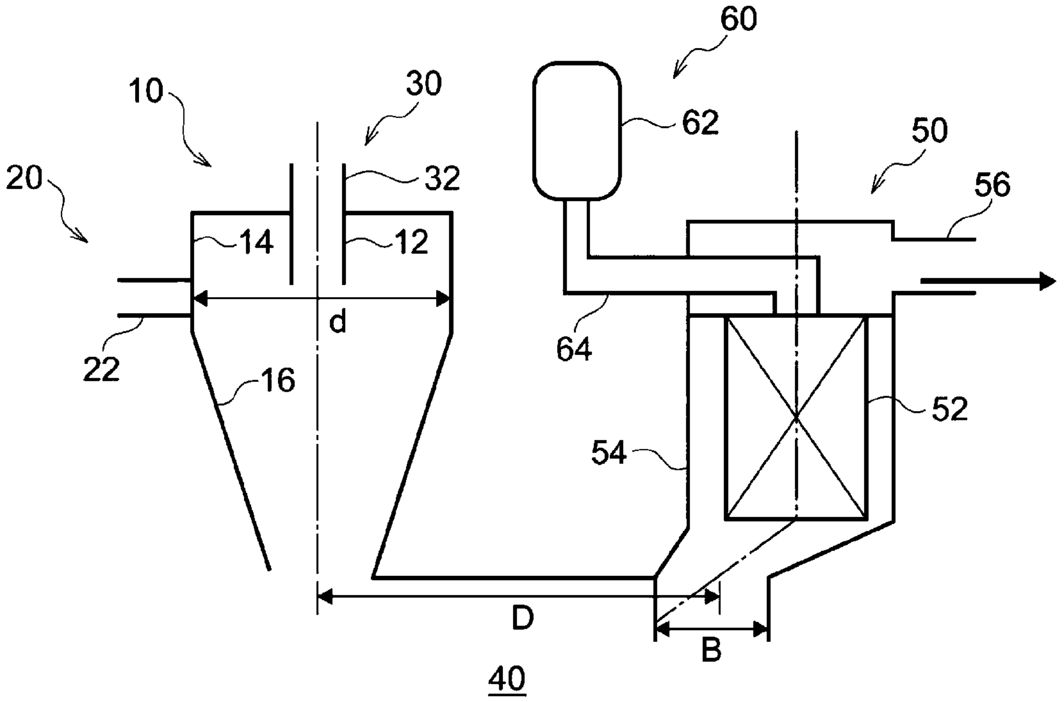
FIG. 2 is an enlarged schematic view of an example of the toner collecting device used in the method for producing a toner according to the exemplary embodiment.

Next, the obtained toner is transported through airflow and collected by the toner collecting device shown in FIG. 1 and FIG. 2.

The settings of the toner collecting device are as described in Table 1.

In Comparative Example 1, the toner is collected by a toner collecting device without a suction unit or a washing unit.

The details in Table 1 are as described below.

Introduction quantity Qin: the introduction quantity Qin ($m^3$/min) at which the airflow containing the toner is introduced to the centrifugation cylinder Suction quantity QBD: the suction quantity QBD ($m^3$/min) of the airflow suctioned by the suction unit Filtration area A: the filtration area A ($m^2$) of the filtration filter Diameter d at airflow introduction position: the inner diameter d (m) of the centrifugation cylinder at the airflow introduction position Washing frequency: the washing frequency (time/min) at which the backwashing unit backwashes the filtration filter Difference between F internal and external pressures: the difference between the internal and external pressures of the filtration filter Distance between centrifugation unit and suction unit: the distance from the center of the joint between the centrifugation cylinder and the toner collector to the center of the joint between the toner collector and the suction unit Aperture diameter B of suction unit: the aperture diameter of the joint between the toner collector and the suction unit Evaluation Recovery Efficiency In each Example, the toner recovery rate of the toner collecting device is evaluated on the basis of the following criteria. A to C are acceptable.

Evaluation Criteria

A: The recovery rate is 99.5% or more.

B: The recovery rate is 97% or more and less than 99.5%.

C: The recovery rate is 95% or more and less than 97%.

D: The recovery rate is less than 95%.

Aggregation (Color Point Evaluation)

Since the aggregation of the toner collected by the toner collecting device causes generation of color points, whether aggregates are generated is determined by evaluating color points in each Example. A developer for "ApeosPort-IV C5575 available from FUJIFILM Business Innovation Corp." including the toner of Example is prepared.

The developer is installed into a developing device in a modified machine of an image forming apparatus "ApeosPort-IV C5575 available from FUJIFILM Business Innovation Corp."

An image with an area coverage of 1% is continuously formed on 1,000 sheets of A4 paper by using the modified machine of the image forming apparatus after being left to stand in a high-temperature and high-humidity environment (28° C., 85% RH environment) for one day. Whether color points are generated is visually determined for 101 sheets from the 900th sheet to the 1000th sheet and evaluated on the basis of the following criteria. A to C are acceptable.

Evaluation Criteria

A: No color points are generated.

B: The number of sheets having color points in 1 or more areas is 1 or more and less than 3.

C: The number of sheets having color points in 1 or more areas is 3 or more and less than 5.

D: The number of sheets having color points in 1 or more areas is 5 or more.

TABLE 1

| | Introduction Quantity Qin ($m^3$/min) | Suction Quantity QBD ($m^3$/min) | Filtration Area A ($m^2$) | Diameter d at Airflow Introduction Position (mm) | QBD/Qin (%) | A/QBD | Qin/$d^2$ | QBD/$d^2$ |
|---|---|---|---|---|---|---|---|---|
| Example 1 | 15 | 1.2 | 2 | 300 | 8 | 1.7 | 167 | 13 |
| Example 2 | 15 | 0.015 | 0.0255 | 300 | 0.1 | 1.7 | 167 | 0.2 |
| Example 3 | 15 | 4.5 | 7.65 | 300 | 30 | 1.7 | 167 | 50 |
| Example 4 | 15 | 1.2 | 0.48 | 300 | 8 | 0.4 | 167 | 13 |
| Example 5 | 15 | 1.2 | 4.8 | 300 | 8 | 4 | 167 | 13 |
| Example 6 | 15 | 1.2 | 3 | 2236 | 8 | 2.5 | 3 | 0.2 |
| Example 7 | 15 | 1.2 | 2.04 | 158 | 8 | 1.7 | 601 | 48 |
| Example 8 | 15 | 1.2 | 0.49 | 1000 | 8 | 0.41 | 15 | 1 |
| Example 9 | 15 | 1.2 | 4.59 | 175 | 8 | 3.83 | 490 | 39 |
| Example 10 | 15 | 1.2 | 2 | 300 | 8 | 1.7 | 167 | 13 |
| Example 11 | 15 | 1.2 | 2 | 300 | 8 | 1.7 | 167 | 13 |
| Example 12 | 15 | 1.2 | 2 | 300 | 8 | 1.7 | 167 | 13 |
| Example 13 | 15 | 1.2 | 2 | 300 | 8 | 1.7 | 167 | 13 |
| Example 14 | 15 | 1.2 | 2 | 300 | 8 | 1.7 | 167 | 13 |
| Example 15 | 15 | 1.2 | 2 | 300 | 8 | 1.7 | 167 | 13 |
| Example 16 | 15 | 1.2 | 2 | 300 | 8 | 1.7 | 167 | 13 |
| Example 17 | 15 | 1.2 | 2 | 300 | 8 | 1.7 | 167 | 13 |
| Comparative Example 1 | — | — | — | — | — | — | — | — |
| Comparative Example 2 | 15 | 6 | 2.6 | 300 | 40 | 0.4 | 167 | 67 |
| Comparative Example 3 | 15 | 1.2 | 0.24 | 300 | 8 | 0.2 | 167 | 13 |
| Comparative Example 4 | 15 | 1.2 | 9.6 | 350 | 8 | 8 | 122 | 10 |

| | A/$d^2$ | Frequency of Washing (time/min) | Difference Between F Internal and External Pressures (Kpa) | Distance Between Centrifugation Unit and Suction Unit xd(m) | Aperture Diameter B of Suction Unit xd(m) | Evaluation recovery rate | Evaluation aggregation |
|---|---|---|---|---|---|---|---|
| Example 1 | 22 | 0.5 | 0.2 | 1 | 1 | A | A |
| Example 2 | 0.3 | 0.5 | 0.2 | 1 | 1 | B | A |
| Example 3 | 85 | 0.5 | 0.2 | 1 | 1 | B | B |
| Example 4 | 5 | 0.5 | 0.2 | 1 | 1 | B | B |
| Example 5 | 53 | 0.5 | 0.2 | 1 | 1 | B | A |
| Example 6 | 0.6 | 0.5 | 0.2 | 1 | 1 | C | A |
| Example 7 | 82 | 0.5 | 0.2 | 1 | 1 | B | C |
| Example 8 | 0.49 | 0.5 | 0.2 | 1 | 1 | C | C |
| Example 9 | 150 | 0.5 | 0.2 | 1 | 1 | B | B |
| Example 10 | 22 | 0.5 | 0.5 | 1 | 1 | B | A |
| Example 11 | 22 | 0.5 | 0.8 | 1 | 1 | B | B |
| Example 12 | 22 | 1 | 0.2 | 1 | 1 | C | B |
| Example 13 | 22 | 0.25 | 0.2 | 1 | 1 | B | B |
| Example 14 | 22 | 0.5 | 0.2 | 0.1 | 1 | C | B |

TABLE 1-continued

| | | | | | | | |
|---|---|---|---|---|---|---|---|
| Example 15 | 22 | 0.5 | 0.2 | 2 | 1 | C | B |
| Example 16 | 22 | 0.5 | 0.2 | 1 | 0.1 | B | B |
| Example 17 | 22 | 0.5 | 0.2 | 1 | 2 | C | B |
| Comparative Example 1 | — | — | — | — | — | D | A |
| Comparative Example 2 | 29 | 0.5 | 0.2 | 1 | 1 | D | D |
| Comparative Example 3 | 3 | 0.5 | 0.2 | 1 | 1 | D | D |
| Comparative Example 4 | 78 | 0.5 | 0.2 | 1 | 1 | D | B |

The results described above indicate that the toner recovery rate is higher and the toner is less likely to aggregate in Examples than in Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A method for collecting a toner, the method comprising:

introducing, using an airflow inlet, a centrifugation cylinder with an airflow containing a toner;

centrifugally separating, using the centrifugation cylinder, the toner by a swirling flow caused by the introduced airflow;

discharging, using an airflow outlet, the airflow from which the toner has been separated in the centrifugation cylinder, wherein the airflow outlet is located at an upper end of the centrifugation cylinder;

collecting, using a toner collector, the toner separated in the centrifugation cylinder, wherein the toner collector is located at a lower end of the centrifugation cylinder;

suctioning, using a suction unit, an inside of the centrifugation cylinder through the toner collector; and filtering out, using a filtration filter of the suction unit, the toner in an airflow suctioned by the suctioning unit, wherein a ratio of a suction quantity QBD ($m^3$/min) of the airflow suctioned by the suction unit to an introduction quantity Qin ($m^3$/min) at which the airflow containing the toner is introduced to the centrifugation cylinder is more than 0% and 30% or less, and wherein a ratio of a filtration area A ($m^2$) of the filtration filter to the suction quantity QBD ($m^3$/min) of the airflow suctioned by the suction unit is 0.4 or more and 4.0 or less.

2. The method for collecting the toner according to claim 1, wherein the introduction quantity Qin ($m^3$/min) at which the airflow containing the toner is introduced to the centrifugation cylinder and an inner diameter d (m) of the centrifugation cylinder at an airflow introduction position satisfy $5 \leq Qin/d^2 \leq 500$.

3. The method for collecting the toner according to claim 2, wherein the suction quantity QBD ($m^3$/min) of the airflow suctioned by the suction unit and the inner diameter d (m) of the centrifugation cylinder at the airflow introduction position satisfy $0 < QBD/d^2 \leq 150$.

4. The method for collecting the toner according to claim 3, wherein the filtration area A ($m^2$) of the filtration filter and the inner diameter d (m) of the centrifugation cylinder at the airflow introduction position satisfy $0.5 \leq A/d^2 \leq 100$.

5. The method for collecting the toner according to claim 1, wherein the method further comprises backwashing the filtration filter using a backwasher.

6. The method for collecting the toner according to claim 5, wherein the backwashing the filtration filter comprises backwashing the filtration filter at a frequency that is 0.5 times/min or more.

7. The method for collecting the toner according to claim 5, wherein a difference between internal and external pressures of the filtration filter is more than 0 KPa and 0.5 KPa or less.

8. The method for collecting the toner according to claim 1, wherein a distance from a center of a joint between the centrifugation cylinder and the toner collector to a center of a joint between the toner collector and the suction unit is 0.3d or longer and 1.5*d* or shorter, where d denotes an inner diameter (m) of the centrifugation cylinder at the airflow inlet.

9. The method for collecting the toner according to claim 8, wherein the joint between the toner collector and the suction unit has an aperture diameter of 0.3d or more and 1.5d or less, where d denotes the inner diameter (m) of the centrifugation cylinder at the airflow inlet.

* * * * *